Sept. 17, 1940.  C. W. E. WITTER ET AL  2,215,259
STRAIN GAUGE
Filed May 25, 1939
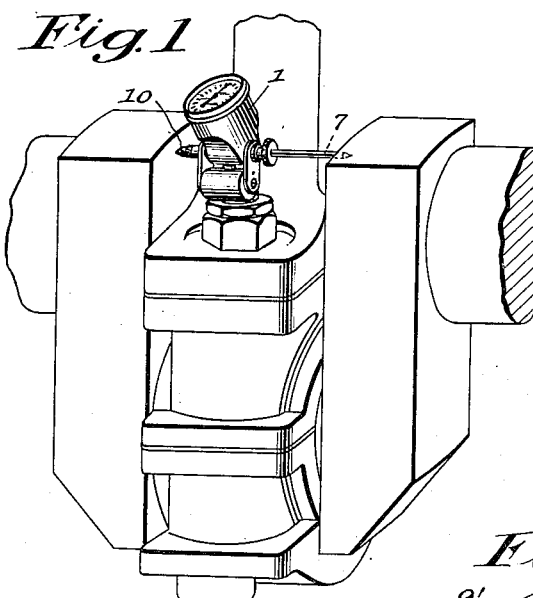
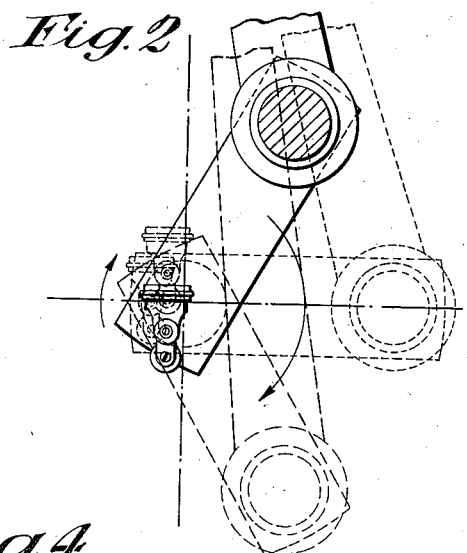
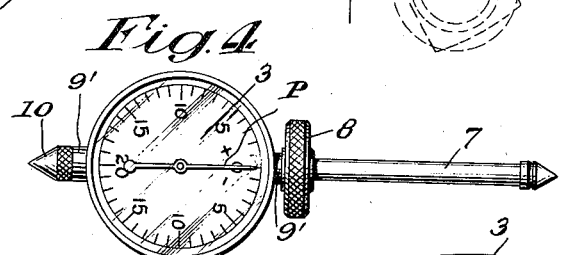
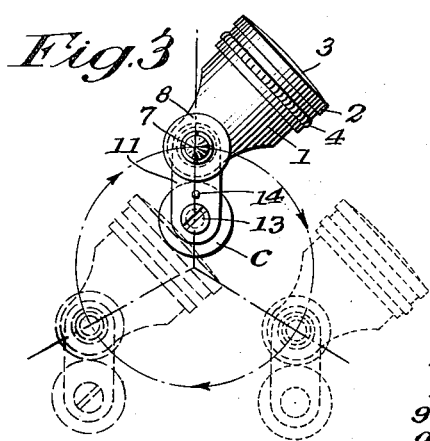
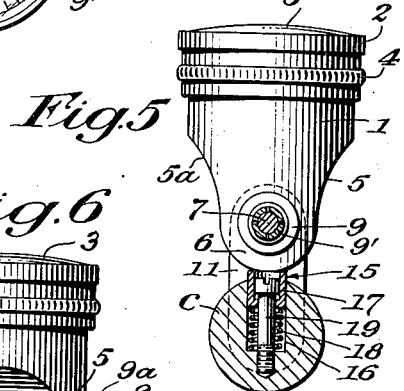
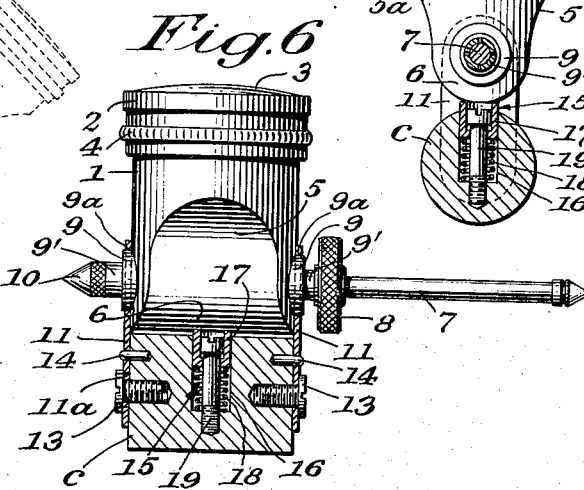
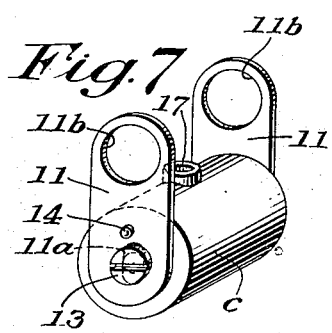
INVENTORS:
Chester W. E. Witter and
James G. Sisson
BY Spear Rawlings & Spear
ATTORNEYS.

Patented Sept. 17, 1940

2,215,259

UNITED STATES PATENT OFFICE 2,215,259

STRAIN GAUGE

Chester W. E. Witter, Ridgewood, N. J., and James G. Sisson, Athol, Mass., assignors to The L. S. Starrett Company, Athol, Mass., a corporation of Massachusetts Application May 25, 1939, Serial No. 275,656

23 Claims. (Cl. 33—147)

This invention relates to improvements in strain or alignment gauges and attachments for the same, and particularly those of the class used for measuring crank shaft distortion, bearing wear or strain, and aligning cylinder and engine frame, as well as Diesel engine shafts. These are inside measuring gauges, the dial of which reads by thousands of an inch, for example, distortion of the webs of crank shafts, which distortion bears a direct relation to any existing misalignment or excessive wear of the bearings. Our invention contemplates free positioning of the gauge on its contact points with the dial turned towards the workman who thus is enabled to check bearing alignment or deflection of the shaft without having to dismantle the engine or even stop it if running.

In making such tests it is desired often to insert the strain gauge between parts which rotate or otherwise change their position with respect to the operator, and therefore the face of the gauge often is turned into positions wherein the operator can not see it.

Our present invention includes the provision with such a strain gauge of means which causes it to pivot on its contact points so that its dial will always face in a predetermined direction in which it can be readily observed by the operator. In some cases it is best to have the dial face turned upward but in other cases the face may be more readily observed from an angle. According to our concept, this question may be decided before the gauge is positioned with respect to the parts on which tests, repair or adjustment are to be made, and proper adjustment made. Once adjusted, the dial indicator pivots on its contact points as required by changes in position of the surfaces on which the same are mounted so that it will continue to face in the selected direction regardless of change in its location as where the surfaces on which it is mounted may be carried under, above, or laterally of the place originally occupied.

We secure this desired result by providing a standard strain gauge with a counterweight which in weight overbalances the indicator and causes it on change in position of the surfaces it contacts to rock or pivot on its contact points as determined by the center of gravity of the combined indicator and counterweight which will vary according to their adjustment relative to each other.

In the selected embodiment of our invention which we illustrate and describe herein, this counterweight may be suspended from the indicator gauge casing by plates, links or other means pivotally supported on hubs or other members oppositely extending from the indicator casing and through which hubs on one side protrudes the pressure resisting contact point and on the other side the pointed end of any selected indicator rod. As a result of special spring tension the gauge is self-sustaining on these points in selected positions without any sacrifice of the rigidity necessary to its functioning, thus leaving the hands of the operator free. On these points under the influence of the counterweight the indicator gauge pivots upon rotation or other movement of the shaft or other object contacted by the points, so that the direction in which the dial pointed when the gauge was positioned does not change, although the indicator itself may be carried by the shaft or other part on which it is mounted throughout its travel.

Our counterweight may be permanently affixed to the gauge casing so as to be an integral part of the gauge, or it may be provided as an auxiliary device, its construction being such that it may readily be attached to any standard strain gauge. It is of such weight that when the indicator is aligned with the counterweight, the weight falls by gravity directly beneath it. However, the counterweight is held in spring controlled friction contact with the indicator casing and may be manually turned on its pivots up or down on opposite sides relative to the vertical axis of the indicator within the limitation of its construction as hereinafter described. While throughout the specification we refer to this auxiliary device as a counterweight, it will be understood that this term is not strictly accurate as it preferably slightly more than counterweights or balances the indicator.

In the accompanying drawing we have shown our counterweight applied to a strain gauge of standard construction. Throughout the specification and drawing like reference characters are employed to indicate corresponding parts. In the drawing:

Fig. 1 is a perspective of our counterweighted strain gauge as positioned to test the alignment of a crank shaft.

Fig. 2 illustrates the erect position maintained by the counterweighted strain gauge regardless of rotation of the shaft which is being tested with its dial always facing in the same predetermined direction.

Fig. 3 schematically indicates the self-adjustment of one of our indicators and its counterweight and the maintenance of its dial in selected posture regardless of change of position of the shaft under test.

Fig. 4 is a plan view of a strain gauge according to our invention.

Fig. 5 is a side view of the dial body, the counterweight hub and rod being shown in partial section.

Fig. 6 is a view at right angles to that of Fig. 5, the counterweight being shown in longitudinal section, and Fig. 7 is a perspective of the counterweight attachment apart from the strain gauge.

The strain gauge for which we provide or on which we assemble our novel counterweight comprises a hollow casing or frame 1, bezel 2, dial 3 and knurled ring 4 for adjusting the dial in relation to the pointer P. The lower portion of the casing is reduced or concaved on opposite sides as at 5, the concaved portions merging with the rounded bottom to provide the semi-cylinder 6. From the ends of this semi-cylinder 6 extend oppositely disposed hubs 9. These hubs have shoulder portions 9a and reduced extensions 9', one of which extensions is threaded externally and the other internally. The hubs 9 fit bores through the casing wall and are rigidly held therein by screws (not shown).

Into the internally threaded hub extension 9' is screwed the pressure responsive pointed contact 10 which is operatively connected with indicator transmitting mechanism (not shown) within the hollow casing 1, and which mechanism moves the dial pointer P.

Into the externally threaded hub 9' may be inserted any fixed indicator rod of desired length as shown at 7. This hub is longitudinally slotted and with the knurled nut 8 provides a little chuck for holding the rod 7 in rigid adjusted position.

On the shoulders 9a of the hubs 9 may be pivotally supported the plates or links 11 from which suspend our counterweight C which is a relatively heavy metallic cylinder as shown in Figs. 6 and 7. These plates or links 11 are screwed as at 13 and doweled as at 14 to the ends of the counterweight C. The free or hub ends of the plates or links 11 are provided with apertures 11b for embracing the hubs 9 on which they pivot as required to give the desired circumferential adjustment of counterweight relative to indicator, so that the indicator dial may readily be observed by the operator as before explained.

The counterweight C is maintained in circumferential adjustment relative to the semi-cylindrical bottom portion 6 of the indicator casing 1 by means of the spring plunger or plug 15 shown in Figs. 5 and 6. This plunger or plug is supported within the bore 16 extending radially transversely of the cylindrical body of the counterweight. It includes a collar 17 which projects outwardly from the periphery of the bore 16 as shown in Fig. 7, and frictionally bears against the rounded semi-cylindrical bottom 6 of the casing 1 under the tension of the spring 18. The collar 17 and spring 18 are held in the bore 16 by means of the retaining screw 19.

The frictional contact between the semi-cylindrical bottom 6 of the indicator casing 1 and the upper edges of the collar 17 under the influence of the spring 18 is sufficient to overcome the inherent tendency of the counterweight to swing straight down beneath the indicator because of its greater weight. As a result of this frictional engagement, the counterweight may be turned on the hubs 9 to establish the desired adjustment between indicator casing and counterweight, the upward pivoting of the counterweight C however with respect to the indicator casing terminating when the rounded surface of the counterweight contacts the upwardly flaring sweep 5a of the casing wall over the concaved sides 5. Thus, while the dial may be made to face upwardly or at any angle on either side of the vertical, according to changes in the center of gravity of combined indicator and counterweight components resulting from change in their relative positions, the dial will never face directly downward. Within these limits, any selected adjustment will be maintained by the spring controlled friction contact between the semi-cylinder 6 and collar 17.

As indicated above, the counterweight C causes the positioned indicator to pivot on its points 7 and 10 so that regardless of rotation of the surfaces contacted by these points and the fact that the indicator travels with the same, the indicator continues to face in the same direction though from different locations, as illustrated in Figs. 2 and 3.

In use, after determination of the surfaces on which the indicator is to be mounted, adjustment is made between gauge casing and counterweight as required to direct the dial face toward the point desired by the operator. The gauge is then mounted on its contact points 7 and 10, as for example in Fig. 1. These points were formerly made with a 90° included angle, but we make them with a 60° angle so that where there is a 45° face or chamfer presented, the points nevertheless may be mounted on the same.

In cases where the counterweight is to be attached to a standard strain gauge, the knurled chuck 8 and indicating point 10 are unscrewed from the hubs, and the hubs 9 slipped through the apertures in the ends of the plates or links 11 which extend from the ends of the counterweight, the links bearing on the shoulders 9'. The chuck and indicating point are then rescrewed into or onto the hubs and lock the links thereon.

What we therefore claim and desire to secure by Letters Patent is:

1. An inside test indicator comprising a casing, a dial on said casing, a resiliently resistant contact member and a fixed contact member extending transversely of said casing and by means of which said indicator is mounted during testing operations on the surfaces to be tested, a counterweight for said casing, said casing and counterweight being angularly adjustable relative to each other to point the dial in predetermined direction, said counterweight automatically turning said contact members on the surfaces on which they are mounted so that said dial continues to point in said predetermined direction during any testing operation regardless of movement of said surfaces.

2. An inside test indicator comprising a casing, a dial on said casing, a resiliently resistant contact member and a fixed contact member extending transversely of said casing and by means of which said indicator is mounted during testing operations on the surfaces to be tested, oppositely disposed hubs extending from said casing, a counterweight, means pivotally supporting said counterweight from said hubs, means interposed between said counterweight and casing for adjusting said parts angularly relative to each other and to point said dial in predetermined direction and for maintaining said parts in their adjusted position, said counterweight automatically turning said contact members on the surfaces on which they are mounted so that said dial continues to point in said predetermined direction during any testing operation regardless of movement of said surfaces.

3. The indicator of claim 2, the indicator casing having a semi-cylindrical portion opposite to the dial, said counterweight being a cylinder and said adjustment between casing and counterweight being circumferentially of the cylindrical surfaces thereof.

4. The indicator of claim 2, the hubs extending from the casing wall being hollow and said contact members extending axially of said hubs.

5. The indicator of claim 2, said hubs including shouldered portions adjacent the casing wall, the means pivotally supporting said counterweight being mounted on said hub shoulders.

6. The indicator of claim 2, said hubs including shouldered portions adjacent the casing wall and reduced extensions, said contact members extending axially from said extensions and means on said extensions locking said contacts rigidly thereon, the means pivotally supporting said counterweight being mounted on said hub shoulders inwardly of said contact locking means.

7. The indicator of claim 2, the means interposed between said casing and counterweight being a spring plunger included in the counterweight and continuously bearing against said casing wall.

8. The indicator of claim 2, the indicator casing having a semi-cylindrical portion opposite to the dial, said counterweight being a cylinder and said adjustment between casing and counterweight being circumferentially of the cylindrical surfaces thereof, and the means interposed between said counterweight and said casing wall being a spring controlled plunger extending radially from the cylindrical wall of the counterweight and bearing against the cylindrical surface of the semi-cylindrical portion of the indicator casing.

9. The indicator of claim 2, the means supporting the counterweight from the hubs being a pair of links secured to opposite sides of said counterweight and in their outer ends having apertures to receive the hubs on the casing.

10. The combination of an inside dial test indicator comprising a hollow frame having a dial, an indicator transmitting mechanism in said hollow frame, and contact members operatively associated with the indicator transmitting mechanism and extending transversely from said frame and by means of which said indicator is mounted on the surfaces to be tested, with a counterweight, means pivotally connecting said counterweight to said indicator frame, and means included in said counterweight continuously resistantly contacting said frame, whereby said counterweight and frame may be adjusted to and maintained in selected angular relation pointing said dial in predetermined direction, said counterweight being so balanced with respect to said indicator that it turns said contact members on the surfaces on which they are mounted so that the dial continues to point in said predetermined direction throughout the testing operation.

11. The combination of an inside dial test indicator comprising a hollow frame having a dial, a semi-cylindrical bottom portion opposite said dial, an indicator transmitting mechanism in said hollow frame, and contact members operatively associated with the indicator transmitting mechanism and extending transversely from said frame and by means of which said indicator is mounted on the surfaces to be tested, with a counterweight, means pivotally connecting said counterweight to said semi-cylindrical portion of said frame, and means included in said counterweight continuously resistantly contacting said semi-cylindrical portion of said frame, whereby said counterweight and frame may be adjusted to and be maintained in selected angular relation pointing said dial in predetermined direction, said counterweight being so balanced with respect to said indicator that it turns said indicator contact members on the surfaces on which they are mounted so that the dial continues to point in said predetermined direction throughout the testing operation.

12. A counterweight attachment for a strain gauge, said gauge having a frame, indicator transmitting mechanism in said frame, a pair of oppositely disposed hubs extending from said frame, resiliently resistant contact members operatively associated with the indicator transmitting mechanism and extending transversely from said frame, said counterweight comprising a cylindrical body, a pair of arms one attached to each end of said cylindrical body, and having apertures in their outer ends adapted to encircle and pivot on said hubs, and a spring controlled plunger projecting radially from the cylindrical surface of said counterweight and adapted to frictionally engage the indicator frame when said links encircle said hubs, whereby circumferential adjustment between frame and counterweight may be made.

13. An inside test indicator comprising a casing, a dial on said casing, contact members extending from said casing and by means of which said indicator is mounted during testing operations on the surfaces to be tested, a counterweight for said indicator, means for adjusting said casing and counterweight relative to each other to point the dial in predetermined direction, and means for maintaining said parts in their adjusted position, said counterweight automatically turning said contact members on the surfaces on which they are mounted so that regardless of movement of said surfaces said dial continues to point in said predetermined direction during the testing operation.

14. The indicator of claim 13, the means for maintaining the casing and counterweight in adjusted position being a resilient member projecting from one of said elements and continuously frictionally contacting the adjacent surface of the other element.

15. A counterweight attachment for an inside test indicator, said indicator having a frame, said counterweight comprising a body, a resilient member projecting from said body and means for movably connecting said body to said indicator frame to hold said resilient member in frictional contact with said frame so that angular adjustment of counterweight relative to said frame may be effected and maintained.

16. The counterweight attachment of claim 5, in which the resilient member is a spring controlled plunger projecting from the counterweight body.

17. In combination, a dial indicator having a frame, a counterweight movably connected to said frame, and frictioning means disposed between said frame and counterweight whereby they are maintained in selected angular adjustment relative to each other.

18. An inside test indicator including a casing, an indicating dial on said casing, a resiliently resistant contact member and an aligned fixed contact member disposed transversely of said casing below the plane of the dial, mechanism for transmitting motion from the resilient contact member to the indicating dial, said contact members having oppositely disposed points by means of which the indicator may be suspended during testing operations on opposing surfaces to be tested, and a counterweight for said casing below the line of said contacts and effective to maintain the indicator erect on its contact points during testing.

19. An inside test indicator comprising a casing, a dial on said casing, contact members extending from said casing and by means of which said indicator is mounted during testing operations on the surfaces to be tested, a counterweight for said indicator movably supported from said casing, said counterweight automatically turning said contact members on the surfaces on which they are mounted so that regardless of movement of said surfaces said dial continues to point in the same direction during the testing operation.

20. An indicator including a casing, indicating means associated with said casing, contact members extending from said casing and by means of which said indicator is mounted during testing operations on the surfaces to be tested, and a counterweight for said indicator suspended from the casing for pivotal motion about an axis which substantially coincides with the axis of the contact members.

21. An indicator including a casing, indicating means associated with said casing, contact members extending from said casing and by means of which said indicator is mounted during testing operations on the surfaces to be tested, and means for automatically turning said casing through said contact members relative to said surfaces so that regardless of movement of said surfaces said indicating means continues to point in the same direction throughout the testing operation.

22. An indicator including a casing, indicating means associated with said casing, means on said casing for mounting said indicator on the surfaces to be tested, and counterweight means eccentrically disposed relative to said mounting means for automatically turning said casing relative to the surfaces being tested so that regardless of movement of said surfaces said indicating means continues to point in the same direction throughout the testing operation.

23. The indicator of claim 22, said counterweight being angularly adjustable relative to said frame and means for maintaining any selected adjustment between counterweight and frame.

CHESTER W. E. WITTER.
JAMES G. SISSON.